United States Patent [19]

Kulkarni

[11] 4,247,428

[45] Jan. 27, 1981

[54] ADHESIVE FOR POLYESTERS AND POLYOLEFINS

[75] Inventor: Mohan V. Kulkarni, Ashland, Ohio

[73] Assignee: The Goodyear Tire & Rubber Company, Akron, Ohio

[21] Appl. No.: 67,077

[22] Filed: Aug. 16, 1979

[51] Int. Cl.³ .............................................. C08L 91/06
[52] U.S. Cl. ...................... 260/28.5 AV; 260/33.6 UA
[58] Field of Search .............. 260/28.5 AV, 33.6 UA; 525/222

[56] References Cited

U.S. PATENT DOCUMENTS

| | | | |
|---|---|---|---|
| 3,615,106 | 10/1971 | Flanagan et al. | 260/28.5 AV |
| 3,887,738 | 6/1975 | Taft et al. | 260/28.5 AV |
| 4,167,433 | 9/1979 | Lakshmanan | 260/28.5 AV |

*Primary Examiner*—Lewis T. Jacobs
*Attorney, Agent, or Firm*—J. D. Wolfe

[57] ABSTRACT

A hot melt adhesive especially suitable for adhering polyesters to polyolefins composed on a weight percent basis of about 35 to 45 percent of a copolymer of ethylene and vinyl acetate and about 5 to 15 percent by weight of a copolymer of ethylene-ethyl acrylate, about 35 to 45 percent of a resin modifier and about 5 to 10 percent of parrafin-rich processing oil and optionally 0 to 5 percent of microcrystalline wax.

8 Claims, No Drawings

ADHESIVE FOR POLYESTERS AND POLYOLEFINS

TECHNICAL FIELD

The present invention relates to an adhesive capable of adhering a polyester to a polyolefin and to the resulting laminate. More particularly this invention relates to a hot melt adhesive capable of adhering to polyesters of terephthalate type and polyethylenes or polypropylenes.

BACKGROUND OF THE INVENTION

Polyesters and polyolefins can be formed into films and extruded shapes or shaped into other structural type members. It is desirable to attach these members together, preferably with an adhesive. For instance, the blow molded polyester bottles are fitted with molded base cups of polyolefins before being filled with a carbonated beverage and marketed.

THE INVENTION

A hot melt adhesive composition suitable for bonding polyester and polyolefin substrates is prepared by making on a weight basis a blend of about 35 to 45 percent of a copolymer of ethylene and vinyl acetate, about 5 to 15 percent of a copolymer of ethylene and ethyl acrylate, about 35 to 45 percent of resin modifier, 5 to 10 percent of paraffin-rich processing oil and 0 to 5 percent of microcrystalline type wax.

This composition suitable as a hot melt adhesive preferably has a softening point of 70° to 80° C., Shore A hardness of at least 40 and preferably 25 to 60, a Brookfield Thermosel melt viscosity of 180° C. of 31 poises, comprised of about 35 to 45 percent of a copolymer of ethylene and vinyl acetate, 5 to 15 percent of a copolymer of ethylene and ethyl acrylate, about 35 to 45 percent of resin modifier, preferably of terpene base or made from C-5 diene based polymer, 5 to 10 percent of paraffin-rich processing oil, 0 to 5 percent of microcrystalline type wax, and preferably an effective amount of an antioxidant, usually 0.5 to 1 percent, to improve thermal stability.

This invention provides a composition useful as a hot melt adhesive to form bonds between a blow-molded polyester bottle, such as from polyethylene terephthalate polyolefin base cup, such as high or low density polyethylene or polypropylene. It is also useful to fasten laminates of polyester to itself or polyolefins. If has been learned that the hot melt adhesive preferably should have a softening point of 70° to 80° C., Shore A hardness of 45 to 55, and a Brookfield Thermosel melt viscosity at 180° C. of 30 to 35 poises to permit good melt flow characteristic to be easily applied and adhered to form useful bonds. A composition having these characteristic properties as a hot melt adhesive is composed of preferably on a weight percent basis of about 35 to 45 percent of a copolymer of ethylene and vinyl acetate containing 17 to 25 percent of vinyl acetate; 5 to 15 percent of a copolymer of ethylene and ethyl acrylate containing 18 to 23 percent of ethyl acrylate, 35 to 45 percent of modified synthetic polyterpene resins with 20 to 25 percent of one resin (softening point 10° to 15° C. and molecular weight 400 to 500) and 15 to 20 percent of another resin (softening point 75° to 80° C. and molecular weight of 800 to 900); 5 to 10 percent processing oil (containing 54 percent paraffinic carbon, 44 percent naphthenic carbon and 2 percent aromatic carbon); 0 to 5 percent microcrystalline wax (with American Melting Point between 82° to 95° C.) and 0.5 to 1 percent of an antioxidant.

Phenol and bisphenol based antioxidants are particularly effective and preferred in these adhesive compositions. Polyphenol antioxidant used in these compositions offers increased resistance to volatility and excellent antioxidant activity. Polyphenols contain alkyl, aryl and cycloalkyl structures of 1 to 20 carbon atoms are useful in this invention.

Best Mode of Carrying Out the Invention

The nature of this invention can be more readily appreciated by the following representative and illustrative examples wherein all parts and percentages are by weight unless otherwise indicated.

EXAMPLE 1

The adhesive composition described in this example and other examples illustrated below were made in a signma blade mixer with oil heated jacket attachment by blending the ingredients listed in the following recipe.

| Ingredients | | Percent |
|---|---|---|
| 1. | Ethylene/vinyl acetate (Melt index: 455–550; % vinyl acetate 17.5–18.5) | 41.80 |
| 2. | Ethylene/ethyl acrylate (Melt index: 20 % ethyl acrylate: 23) | 10.37 |
| 3. | Modified polyterpene resin (A) (Softening Point: 75°–180° C. Mol. Weight: 800–900) | 17.28 |
| 4. | Modified polyterpene resin (B) (Softening point: 10°–15° C. Mol. Weight: 400–500 | 24.50 |
| 5. | Processing Oil | 5.21 |

(Cp = 54%; Cn = 44%; Ca = 2%)

This adhesive composition had a viscosity of 31 poises at 180° C. It yielded satisfactory bonds to the polyester (Mylar, trademark of duPont) and polyolefins (low density and high density polyethylenes). It also gives satisfactory bonds to blow-molded polyester bottles of polyethylene terephthalate type to high density polyethylene base cup. Adhesion to these substrates was measured by "drop test" on bottles to cap and lap shear strength on laminates.

Examples 2 through 4 were made by mixing the ingredients of the following recipe as in Example 1.

EXAMPLES 2–4

| | EXAMPLES 2–4 | | |
|---|---|---|---|
| Materials | 2 | 3 | 4 |
| 1. Ethylene/Vinyl Acetate | 39.73 | 41.80 | 40.00 |
| 2. Ethylene/Ethyl Acrylate | 9.87 | 10.38 | 10.00 |
| 3. Modifying Resin A | 39.73 | 41.80 | — |
| 4. Modifying Resin B | — | — | 45.00 |
| 5. Processing Oil | 4.93 | 5.20 | 4.13 |
| 6. Microcrylstalline Wax | 4.93 | — | — |
| (Mixture of alkylated cycloparaffins, isoparaffins and varying amounts of normal paraffins. Their average molecular weight 580 to 700 and melting point from 82° to 96° C. (ASTM D-127) and needle penetration 5–20 at 25° C. (ASTM D-1321).) | | | |
| 7. Polyphenol Antioxidant | 0.81 | 0.82 | 0.87 |

These blends were used to prepare samples for lap shear bond test samples for said laminates made up of polyester (Mylar-DuPont's trademark) and polyolefins (low and high density polyethylenes). Lap shear values were measured at room temperature and 2° to 4° C. Results are summarized in Table 1.

Adhesive composition described in this invention was also tested for the ability to bond blow-molded polyester of polyethylene terephthalate bottles to high density polyethylene base cups and its resistance to impact at room temperature and 2° to 4° C.

The test procedure for the impact test was carried out by applying three dots of adhesive composition with an adhesive applicator (Nordson applicator AD-25 was used) and adhesive applied at 175° to 180° C., three dots weighing approximately 300 to 400 miligrams, into the base cup (high density polyethylene based) and immediately placing the polyester bottle into the base cup vertically so that three dots are pressed together to provide contact. Bonded specimens after 15 to 20 minutes were filled with prerefrigerated (2° to 4° C.) carbonated beverage and tightly capped to trap most of the carbonation of the beverage. Filled test specimens were placed in water bath (heated at 38° to 42° C.) for five minutes; then conditioned for 24 hours at test temperatures (25° C. and 3° C.) and dropped vertically from six feet on concrete surface and checked for adhesion.

The melt viscosities of adhesive compositions described in this invention were measured on Brookfield Viscometer Model HAT with an SC4-27 Spindle.

TABLE I

| Ingredients Parts by Weight | Examples | | | |
|---|---|---|---|---|
| | 1 | 2 | 3 | 4 |
| 1. Ethylene/vinyl acetate | 41.80 | 39.73 | 41.80 | 40.00 |
| 2. Ethylene/ethyl acrylate | 10.37 | 9.87 | 10.38 | 10.00 |
| 3. Modifying Resin A | 17.28 | 39.73 | 41.80 | — |
| 4. Modifying Resin B | 24.50 | — | — | — |
| 5. Processing Oil | 5.21 | 4.93 | 5.20 | 4.13 |
| 6. Microcrystalline Wax | — | 4.93 | — | — |
| 7. Antioxidant | 0.84 | 0.81 | 0.82 | 0.87 |
| Lap Shear Values on Polyethylene to Mylar | | | | |
| A. Lap Shear at 25° C. | 135 psi | 145 psi | 170 psi | 50 psi |
| Example 1 - cohesive failure | | | | |
| Example 2 - adhesive failure to mylar | | | | |
| Example 3 - failure to polyethylene | | | | |
| Example 4 - cohesive failure | | | | |
| B. Lap Shear at 4° C. | 180 psi | 85 psi | 195 psi | 135 psi |
| Example 1 - AF to Mylar | | | | |
| Example 2 - AF to Mylar | | | | |
| Example 3 - AF to polyethylene | | | | |
| Example 4 - Adh and coh failures | | | | |

Modified resins useful in this invention are C-5 type type resins of the preferred diene-olefin copolymer type. The preferred diene of 4 to 6 carbon atoms is piperylene (1,4-pentadiene) and the preferred monolefin of 2 to 10 carbon atoms is 2-methyl-2-butene. Representative of naturally occurring terpene hydrocarbon resins useful in this invention are those based on $\alpha$-pinene, $\beta$-pinene, limonene and dipentene. Resins from diene-olefin are prepared by cationic polymerization using Lewis acid type catalyst such as aluminum chloride and its alkyl derivatives, boron trifluoride, etc. Resins are represented by those known in the trade as Wingtack TM resins.

In the C-5 type resins the diolefin, preferably piperylene, and the mono-olefin, selected from 2-methyl-2-butene, 2-methyl-1-butene, 2-methyl-1-pentene, 2,3-dimethyl-1-butene, preferably primarily 2-methyl-2-butene are preferably present in the weight ratio of about 0.8/1 to about 4/1. Modifying resin B, Wingtack-10 TM, has a softening point in the range of 10° to 20° C.

While certain representative embodiments and details have been shown for the purpose of illustrating the invention it will be apparent to those skilled in this art that various changes and modifications may be made therein without departing from the spirit or scope of the invention.

I claim:

1. A hot melt adhesive comprised on a percent by weight basis of about 35 to 45 percent of a copolymer of ethylene and vinyl acetate, about 5 to 15 percent by weight of a copolymer of ethylene and ethyl acrylate, about 35 to 45 percent of a resin modifier, about 5 to 10 percent of paraffin rich processing oil, and 0 to 5 percent of microcrystalline wax.

2. The hot melt adhesive of claim 1 wherein the copolymer of ethylene and vinyl acetate contains 17 to 25 percent vinyl acetate and has a melt index range of 400 to 550.

3. The hot melt adhesive of claim 1 wherein the copolymer of ethylene and ethyl acrylate contains 18 to 23 percent ethyl acrylate and has a melt index range of 5 to 20.

4. The hot melt adhesive of claim 1 wherein the resin is present in about 35 to 45 percent.

5. The hot melt adhesive of claim 4 wherein the resin is a polyprene resin having a softening point of 10° to 15° C. and a molecular weight range of 400 to 500 and is present in about 20 to 25 percent.

6. The hot melt adhesive of claim 4 wherein the resin has a softening point of 75° to 80° C. and a molecular weight range of 800 to 900 and is percent in about 15 to 20 percent.

7. The hot melt adhesive of claim 1 wherein the oil is present in about 5 to 10 percent and contains 50±5 percent paraffinic carbon and 40±5 percent naphthenic carbon.

8. The hot melt adhesive of claim 1 wherein the microcrystalline wax has an American Melting Point (AMP) in the range of 80° to 95° C.

* * * * *

UNITED STATES PATENT OFFICE
CERTIFICATE OF CORRECTION

PATENT NO. : 4247428
DATED : January 27, 1981
INVENTOR(S) : Mohan V Kulkarni

It is certified that error appears in the above-identified patent and that said Letters Patent are hereby corrected as shown below:

Col. 1, Line 49 -- If -- to be deleted and It inserted
Col. 2, Line 48 -- "drop test" to be deleted and "drop tests" inserted.
Col. 4, Line 48 in Claim 6, -- percent to be deleted and present inserted.

Signed and Sealed this

Twenty-ninth Day of December 1981

[SEAL]

Attest:

GERALD J. MOSSINGHOFF

Attesting Officer

Commissioner of Patents and Trademarks